United States Patent [19]

Held

[11] Patent Number: 4,466,847
[45] Date of Patent: Aug. 21, 1984

[54] METHOD FOR THE CONTINUOUS PRODUCTION OF LAMINATES

[76] Inventor: Kurt Held, Alte Str. 1, D-7218 Trossingen 2, Fed. Rep. of Germany

[21] Appl. No.: 492,361

[22] Filed: May 6, 1983

Related U.S. Application Data

[63] Continuation of Ser. No. 282,133, Jul. 10, 1981, abandoned, which is a continuation of Ser. No. 906,345, May 15, 1978, abandoned.

[30] Foreign Application Priority Data

May 17, 1977 [DE] Fed. Rep. of Germany ....... 2722262

[51] Int. Cl.$^3$ ........................ B32B 31/08; B32B 31/20
[52] U.S. Cl. .................................. 156/166; 156/307.1; 156/307.3; 156/307.4; 156/308.2; 156/324

[58] Field of Search .................. 156/166, 178, 244.24, 156/244.26, 244.27, 306.9, 307.1, 307.3, 307.4, 307.7, 308.2, 312, 324, 324.4, 335, 381, 510, 549, 498, 551, 578

[56] References Cited

U.S. PATENT DOCUMENTS

| | | | |
|---|---|---|---|
| 2,387,631 | 10/1945 | Weir | 156/578 |
| 3,200,008 | 8/1965 | Holtschmidt et al. | 156/307.4 |
| 4,012,267 | 3/1977 | Klein | 156/324 |

Primary Examiner—Caleb Weston
Attorney, Agent, or Firm—Michael N. Meller

[57] ABSTRACT

A method for continuously producing endless laminates from paper fiber layers consisting of saturating fiber layers with hardenable heat-setting resins followed by drying said saturated fiber layers in a drying tunnel and immediately followed by passing said fiber layers through double-belt press laminating means for curing and further drying to harden said impregnated fiber layers.

1 Claim, 1 Drawing Figure

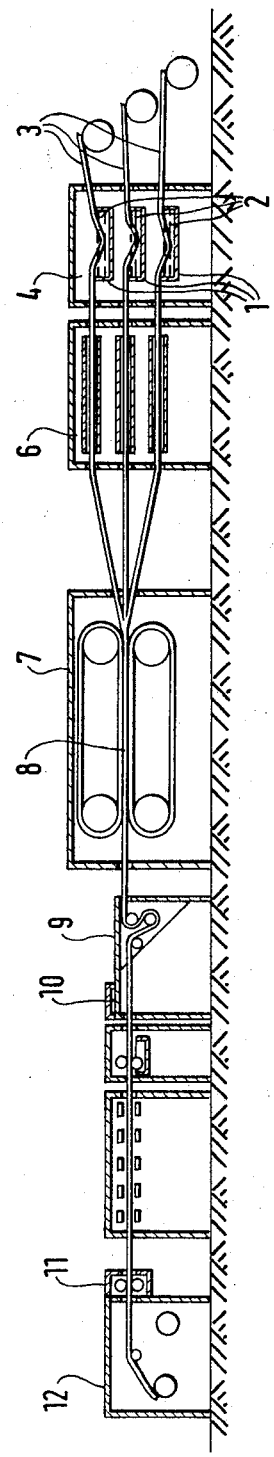

METHOD FOR THE CONTINUOUS PRODUCTION OF LAMINATES

This application is a continuation of application Ser. No. 282,133, filed July 10, 1981, abandoned, which in turn is a continuation of Ser. No. 906,345, filed May 15, 1978, abandoned.

The application relates to a method for the production of track-shaped laminates for fiber layers saturated with hardenable resins.

For about two years, laminates of melamine, ureaformaldehyde resin or phenol resin saturated fiber layers have been produced on a continuously operating installation proposed by the Applicant. It is characteristic of this method representing the state of the art that the impregnation of the paper sheets with saturating resins and their drying up to the so-called B condition and their hardening under pressure and heat application up to the A condition is made in two method steps which are separate timewise and spacewise and take place on different installations.

A decisive disadvantage of this two-step method is the fact that the impregnated paper tracks must be wound on rollers for transportation or intermediate storage. This requires a degree of drying and pre-condensation which is far removed from the ideal one favorable to the production of laminates with optimum cost and properties.

Windable impregnates for continuous laminate manufacture, but also stackable impregnates for discontinuous laminate manufacture, for example, in multilayer presses, must contain no more than 6% moisture if one is to be sure that the individual layers do not get stuck to each other during transport and storage. For this reason it is necessary that during the drying process, which in most cases uses warm ambient air, the impregnated object receives more heat for a longer time and that more moisture be withdrawn than is optimal for the later laminating, that is, compression of the resin-fiber matrix and for transfer to the A condition in the laminating installation.

High-grade laminates are distinguished by a cavity-free resin-fiber matrix with a high fiber content. It is customary in most core layers made of suitable sulphate cellulose papers, to build up resin contents of 30 to 50% relative to the final weight and corresponding fiber contents of 70 to 50%. In cover layers which as a rule are built up of pigmented sulphite cellulose papers, the resin contents are around 50% of the final weight.

In accordance with the pressures of 800–1000 N/cm$^2$ necessary for cavity-free compression, laminates of the abovedescribed construction are also called high-pressure laminates. Besides these, during recent years so-called low-pressure laminates, especially for the direct covering of chip board, have been used increasingly. In order not to exceed the maximum pressures allowable for chip board, the resin content of the cover layers must be increased to 120–140% of the net paper weight if a cavity-free and non-porous resin-paper fiber matrix, i.e., one with a closed surface, is to be produced.

The present invention permits a considerable improvement of procedural condition determining the laminate manufacture.

The paper layers 3, to be saturated with aqueous or solvent-containing resin solutions from a supply tub 1, are saturated in a known impregnating machine 4 in such a way that 50–70% resins relative to the dry paper weight are absorbed. These quantities are absorbed by the usual core- and cover-papers i.e., there are favorable conditions for a subsequent sharp drying by highly heated ambient air, infrared or microwave radiation in the drying tunnel 6 which for this reason, can be constructed extremely short and requires no special devices like carrying air nozzles for transporting the sticky impregnation layer.

The drying tunnel 6 is followed with a minimum spacing by a continuously operating laminating installation 7 which receives the laminate layers dried to an expedient, regularly higher residual moisture without intermediate winding or stacking in the hot condition and hardens in their reaction zone 8 under pressure and heat application. In further stations 9, 10, 11 and 12 the finished laminate layer can be cooled, ground, cut and wound or stacked.

This arrangement in accordance with the invention permits the following advantageous operation.

The dried impregnate layer, since it must not be wound and attention need not be paid to sticking, must be received in the hot state, hence with molten resins and with optimum moisture of 10–12%, from the laminate machine.

Melamine, urea-formaldehyde resins or phenol resin melts are viscous-sticky at 10–12 residual moisture, while the enclosed paper fiber is flexible-soft. The impregnate layer has quasi-soft plastic properties which are ideal for the compression of the fiber-resin matrix in the subsequent laminating machine.

Experiements have shown that the soft-plastic impregnate layer produced as described above, compresses at pressures, i.e., can be laminated, which are between 100 and 200 N/cm$^2$, hence at 10–20% of the values conventional for high-pressure laminates.

Since hard melt with higher residual moisture flow very much easier, hence show a lower viscosity than a melt obtained from dried cold impregnates by reheating, the formation of cavity-free laminates succeeds not only at lower pressures but also at reduced resin contents in the impregnate.

I claim:

1. A method for continuously producing endless laminates from paper fiber layers consisting essentially of the sequence of
   (a) employing an impregnator means for saturating fiber layers with hardenable heat-setting resins so that 50–70% resins relative to the drypaper weight are absorbed immediately followed by;
   (b) drying said saturated fiber layers in a drying tunnel by means of highly heated ambient air, infrared or microwave radiations for minimum pre-condensation to reduce moisture content to 10–12% to result in a flexible soft paper fiber and then immediately followed by;
   (c) passing said fiber layers through double-belt press laminating means for curing and further drying under surface pressure of 100 to 200 Newtons/cm$^2$ for a sufficient period of time depending on transport speed with said pressure being simultaneously applied over a substantially large area for a predetermined time interval while applying heat to harden said impregnated fiber.

* * * * *